US007778996B2

(12) United States Patent
Burger

(10) Patent No.: US 7,778,996 B2
(45) Date of Patent: Aug. 17, 2010

(54) SAMPLING STATISTICS IN A DATABASE SYSTEM

(75) Inventor: Louis M. Burger, Escondido, CA (US)

(73) Assignee: Teradata US, Inc., Miamisburg, OH (US)

( * ) Notice: Subject to any disclaimer, the term of this patent is extended or adjusted under 35 U.S.C. 154(b) by 1117 days.

(21) Appl. No.: 10/255,734

(22) Filed: Sep. 25, 2002

(65) Prior Publication Data

US 2004/0059743 A1 Mar. 25, 2004

(51) Int. Cl.
*G06F 7/00* (2006.01)
(52) U.S. Cl. .................................. 707/713; 707/716
(58) Field of Classification Search ................ None
See application file for complete search history.

(56) References Cited

U.S. PATENT DOCUMENTS

| | | | | |
|---|---|---|---|---|
| 5,303,383 A | | 4/1994 | Neches et al. ............... | 395/500 |
| 5,511,190 A | * | 4/1996 | Sharma et al. .................. | 707/1 |
| 5,625,815 A | | 4/1997 | Maier et al. .................. | 395/608 |
| 5,627,533 A | * | 5/1997 | Clark ............................ | 341/51 |
| 5,640,584 A | | 6/1997 | Kandasamy et al. ......... | 395/800 |
| 5,864,842 A | | 1/1999 | Pederson et al. ............... | 707/3 |
| 5,870,752 A | | 2/1999 | Gibbons et al. ............. | 707/102 |
| 5,884,299 A | | 3/1999 | Ramesh et al. ................. | 707/2 |
| 5,950,188 A | | 9/1999 | Wildermuth .................... | 707/3 |
| 5,970,495 A | | 10/1999 | Baru et al. .................. | 707/102 |
| 6,223,171 B1 | | 4/2001 | Chaudhuri et al. ............. | 707/2 |
| 6,691,099 B1 | * | 2/2004 | Mozes ............................ | 707/2 |
| 2002/0120435 A1 | * | 8/2002 | Frazier et al. .................. | 704/1 |
| 2003/0088579 A1 | * | 5/2003 | Brown et al. ............. | 707/104.1 |
| 2006/0036600 A1 | * | 2/2006 | Chaudhuri et al. ............. | 707/7 |

OTHER PUBLICATIONS

Eugene Wong et al., ACM Transactions on Database Systems, vol. 1, No. 3, "Decomposition-A Strategy for Query Processing," pp. 223-241 (Sep. 1976).
P. Griffiths Selinger et al., ACM, "Access Path Selection in a Relational Database Management System," pp. 23-34 (1979).
Masaru Kitsuregawa et al., Institute of Industrial Science, University of Tokyo, "Query Execution for Large Relations on Functional Disk System," pp. 159-167 (1989).
D.D. Chamberlin et al., "Views, Authorization, and Locking in a Relational Data Base System," National Computer Conference, pp. 425-430 (1975).
D.D. Chamberlin et al., "Sequel 2: A Unified Approach to Data Definition, Manipulation, and Control," IBM Journal of Research and Development, vol. 20, pp. 560-575 (Nov. 1976).
U.S. Appl. No. 09/976,632, filed Oct. 12, 2001.

(Continued)

*Primary Examiner*—Charles Rones
*Assistant Examiner*—Belix M Ortiz
(74) *Attorney, Agent, or Firm*—Trop, Pruner & Hu P.C.

(57) ABSTRACT

A database system has the ability to perform sampled statistics collection, in which collection of statistics of a table is based on a sample (less than all rows of the table). The sample size is adjusted as the table is scanned in response to detecting a predetermined characteristic of the table (e.g., skewed data values are detected).

18 Claims, 3 Drawing Sheets

OTHER PUBLICATIONS

U.S. Appl. No. 09/977,038, filed Oct. 12, 2001.
U.S. Appl. No. 09/976,634, filed Oct. 12, 2001.
U.S. Appl. No. 10/039,283, filed Dec. 31, 2001.
U.S. Appl. No. 09/608,977, filed Jun. 30, 2000.
U.S. Appl. No. 09/733,529, filed Dec. 8, 2000.

M.W. Blasgen et al., "On The Evaluation of Queries in a Relational Data Base System," IBM Research Report RJ 1745, pp. 1-44 (Apr. 1976).

M.W. Blasgen et al., "Storage and Access in Relational Data Bases," IBM Systems Journal, No. 4, pp. 363-377 (1977).

* cited by examiner

SAMPLING STATISTICS IN A DATABASE SYSTEM

BACKGROUND

A database is a collection of stored data that is logically related and that is accessible by one or more users or applications. A popular type of database is the relational database management system (RDBMS), which includes relational tables made up of rows and columns (also referred to as tuples and attributes). Each row represents an occurrence of an entity defined by a table, with an entity being a person, place, thing, or other object about which the table contains information.

To extract data from, or to update, a relational table in an RDBMS, queries according to a standard database query language (e.g., Structured Query Language or SQL) are used. Examples of SQL query statements include INSERT, SELECT, UPDATE, and DELETE.

As applications become increasingly sophisticated, and data storage needs become greater, higher performance database systems are used. One such database system is the TERADATA® database management system from NCR Corporation. The TERADATA® database systems are parallel processing systems capable of handling relatively large amounts of data. In some arrangements, a database system includes multiple nodes that manage access to multiple portions of data to enhance concurrent processing of data access and updates. In TERADATA® database management systems, concurrent data processing is enhanced by the use of virtual processors, referred to as access module processors (AMPs), to further divide database tasks. Each AMP is responsible for a logical disk space. In response to a query, one or more of the AMPs are invoked to perform database accesses, updates, and other manipulations.

One of the goals of a database management system is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

Typically, an optimizer calculates cost and/or other useful metrics based on statistics of one or more columns (or attributes) of each table. In some cases, statistics are stored in the form of a histogram. In database systems that store large tables, the cost of collecting statistics for such large tables can be quite high, especially if all rows of a table need to be scanned to collect the statistics. As a result, some database users may choose not to collect statistics for columns of tables over a certain size. The lack of statistics for some tables may adversely affect operation of certain components in the database system, such as the optimizer and other tools.

SUMMARY

In general, a mechanism is provided for more effective collection of statistics in a database system. For example, a method for use in a database system includes scanning a sample containing less than all rows of the table. A characteristic of data (e.g., data skew) being read is determined, and a size of the sample is adjusted as the sample is scanned based on the determined characteristic.

Other or alternative features will become more apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
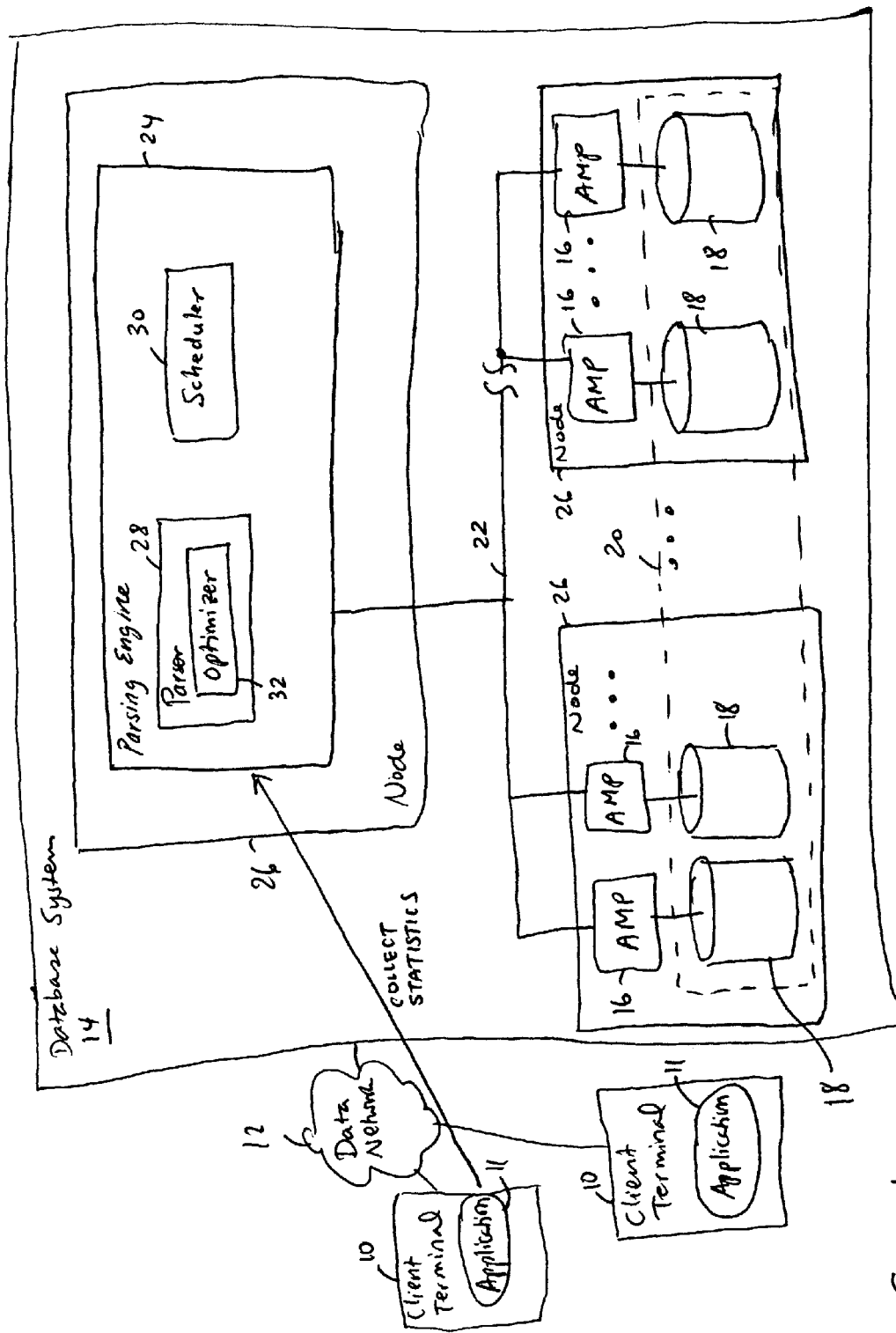
FIG. 1 is a block diagram of an example arrangement of a database system and client terminals coupled to the database system.

As shown in FIG. 1, a database system 14 is coupled over a data network 12 to one or more client terminals 10. Examples of the data network 12 include a local area network (LAN), a wide area network (WAN), the Internet, and so forth. The client terminal 10 is capable of issuing queries according to a standard database query language to the database system 14 to access or update data or to create or alter data structures (e.g., tables, rows, and so forth) in the database system 14. Each client terminal 10 includes application software 11 through which a user can issue various queries to the database system 14. One example of a standard database query language is the Structured Query Language (SQL), provided by the American National Standards Institute (ANSI). One version of SQL is the SQL-92 Standard, while another version is the SQL-99 Standard. In other embodiments, other versions of SQL or other standard database query languages are used.

Also, according to some embodiments, a client terminal is able to issue a COLLECT STATISTICS query to the database system 14 to collect statistics about one or more tables stored in the database system 14. To save the amount of work needed of the database system 14 in collecting statistics, a sample (less than all) of the rows of each table is scanned so that the statistics are based on a percentage (less than 100%) of each table. For a database system 14 that stores large tables, the sampled statistics collecting technique requires less processing time and input/output (I/O) accesses so that the user does not need to wait a long period of time while the database system 14 is collecting statistics.

In one embodiment, the database system 14 is a parallel database system with multiple nodes 26. However, in other embodiments, single-processor database systems are employed. Certain of the nodes 26 of the database system 14 include access module processors (AMPs) 16 (more generally referred to as "access modules") that are capable of concurrently managing access of data stored in respective storage modules 18. The storage modules 18 collectively make up a storage 20 in which various tables and other data structures are stored. The AMPs 16 are software modules that are executable in respective nodes 26. More than one AMP 16 is executable in each node 26. In one embodiment, the AMPs 16 are based on AMPs used in TERADATA® systems from NCR Corporation.

One or more of the nodes 26 include a parsing engine 24, which is coupled to the AMPs 16 over an interconnect layer 22. The AMPs respond to steps (in the form of instructions or commands) received from the parsing engine 24. Responsibilities of the AMPs include locking databases, tables, and portions of tables; creating, modifying, or deleting definitions of tables; inserting, deleting, or modifying rows within tables; and retrieving information from definitions and tables. The AMPs 16 also return responses (e.g., data accessed from a table stored in storage modules 18) to the parsing engine 24.

The parsing engine 24 includes a parser 26 and a scheduler 28. When the parsing engine 24 receives an SQL query from a client application, such as application software 11 running in a client terminal 10, the parser 28 interprets the SQL statement, checks it for proper SQL syntax, and evaluates it semantically. The parser 28 also includes an optimizer 32, whose role is to develop the least expensive plan to return the requested response. Several alternative query plans are evaluated and the most efficient query plan is selected by the optimizer 32. As part of the query selection procedure, the optimizer 32 relies on statistics collected by the database system 14. As discussed further below, such statistics are based on a sample of each table so that all rows of a table do not need to be scanned.

A selected query plan is converted into executable steps that are submitted to the AMPs 16 for execution. The parser 26 passes the generated steps to a scheduler 24, which controls the sequence in which the steps are communicated to the AMPs for execution.

One technique of query optimization performed by the optimizer 32 is to use a cost model to estimate the response times of a given query plan and to search the space of query plans to return a plan with low cost. In the cost-based optimization model, different methods for doing a unit of work are compared and the most efficient method is selected (the plan with the lowest cost). Because the number of alternatives can be quite large, especially in a parallel database system with a large number of nodes storing a large relational database (with many tables), the optimizer 32 uses statistics to reduce the search space in optimizing queries.

Figure 2:
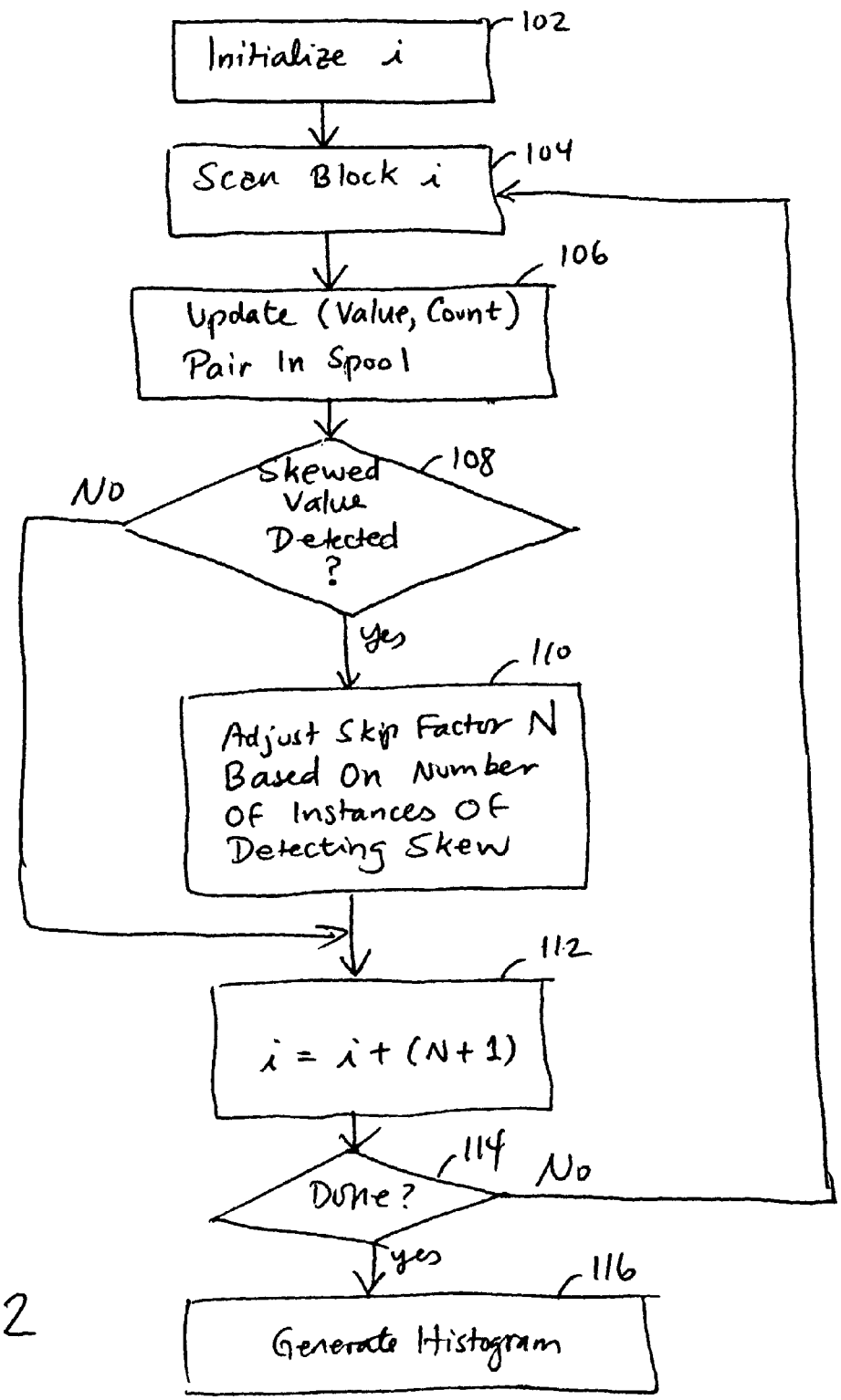
FIG. 2 is a flow diagram of a process of collecting a sample of statistics, according to one embodiment.

FIG. 2 shows an embodiment of collecting statistics for use by the optimizer 32 based on a sample of a table (or a sample of multiple tables) stored in the database system 14. Collecting statistics based on a sample refers to collecting statistics based on reading a percentage (less than 100%) of the rows of a table. Collecting statistics based on a sample reduces the number I/O accesses that are required of the storage 20 of the database system 14, since a smaller number of rows need to be read. This is particularly important for a database system 14 with a large database, since the tables tend to be large and contain many rows. In addition, sampling also reduces the subsequent CPU costs associated with aggregating and sorting the data.

In one implementation, the data contained in the tables of database system 14 is divided into blocks of data. A "block" refers to a portion of data of a predetermined size. In one embodiment, the database system 14 reads rows contained in one block, skips N blocks, reads the next block, skips another N blocks, and so forth. By skipping N blocks, wherein N is greater than or equal to 1, only some predetermined percentage (which is dependent upon the value of N) of data of each table is read. For example, if N equals to 1, then the percentage of rows of a table read is 50%. If N equals to 2, then the percentage of rows read is 33%. N is referred to as the skip factor.

In accordance with some embodiments of the invention, the value of N is varied by the database system 14 based on certain characteristics of the data being read from a given table. One such characteristic is if an attribute data value is skewed. A data value is considered to be skewed if there is a high frequency (higher than some predefined threshold) of the data value in the table. Data distribution is skewed when some values have much higher frequencies than others. For example, given a column (or attribute) C in a table T with M rows, assume one of the column values of C is C1. The value C1 of the column C is considered to be skewed if the frequency of occurrence of C1 in table T is greater than some predefined percentage (e.g., 1%, 2%, etc.) of the total table size (M). If skewed data is detected, then the value of N is reduced.

The query optimizer 32 is more sensitive to a data distribution that is skewed than a data distribution that is uniform. Therefore, when it is determined that the data contained in a given table is skewed, then the value of N is reduced so that a larger number of rows from the given table are read. In effect, by reducing N in response to detection of skewed data, the sample size is increased or made larger for purposes of collecting statistics. Increasing the sample size in the presence of skewed data enhances the accuracy of the statistics that are collected.

According to some embodiments, the statistics collected for a given table are on columns or attributes that are arranged or ordered in the database system 14 according to some predefined algorithm, such as by a hash code or value of the attribute. For example, in the database system 14 with multiple storage modules 18, a given data value is stored on one of the storage modules 18 based on the hash value for the given data value. The data value of an attribute is provided to a hashing algorithm, which produces a row hash. To select which storage module 18 the data value is to be stored on, the row hash is applied to select an entry of a hash map, with the entry containing a number that corresponds to a specific one of the AMPs 16. The corresponding row is then stored in the storage module associated with the selected AMP.

The attributes of a base table that are sorted according to their hash values are the primary indexes of the tables. The sampled statistics collection technique according to some embodiments is thus applied to collect statistics on the primary index of a table, since the primary index is ordered according to the hash value. Similarly, the sampled statistics collection technique can also be applied to collect statistics of a secondary index in a secondary index table (referred to as a subtable). A subtable contains an indexed column (the secondary index) that contains data values sorted by their hash values. A secondary index is typically used to enhance the speed in which a database system is able to access data in a base table. A subtable includes the indexed column as well as respective pointers to rows of the base table. Given a specific value of the indexed column, the pointer(s) to a row or rows of the base table can be used to more quickly retrieve the corresponding row(s) of the base table.

The data to be scanned is sorted by hash code on a given storage module (base table for primary indexes or subtable for secondary indexes). This ensures that equal data values are physically adjacent within the data blocks, which in turn makes it possible to compute accurate counts for those data values that are included in the sample.

Although reference is made to collecting sampled statistics on primary indexes and secondary indexes in this discussion, it is noted that the sampled statistics collection technique can be applied to any attribute(s) that is sorted or ordered according to some predefined algorithm.

FIG. 2 shows a flow diagram of a process according to one embodiment of performing sampled statistics collection. The process shown in FIG. 2 is performed by each of the AMPs 16 in parallel. Thus, each AMP 16 scans a portion of the base table 202 or subtable 204 in collecting sampled statistics. Each AMP is able to adjust the skip factor N independently (and thus adjust the sample size). Although described in the context of a parallel system, the sampled statistics collection technique can also be applied to a uni-processing system, e.g., a single-AMP system.

Figure 3:
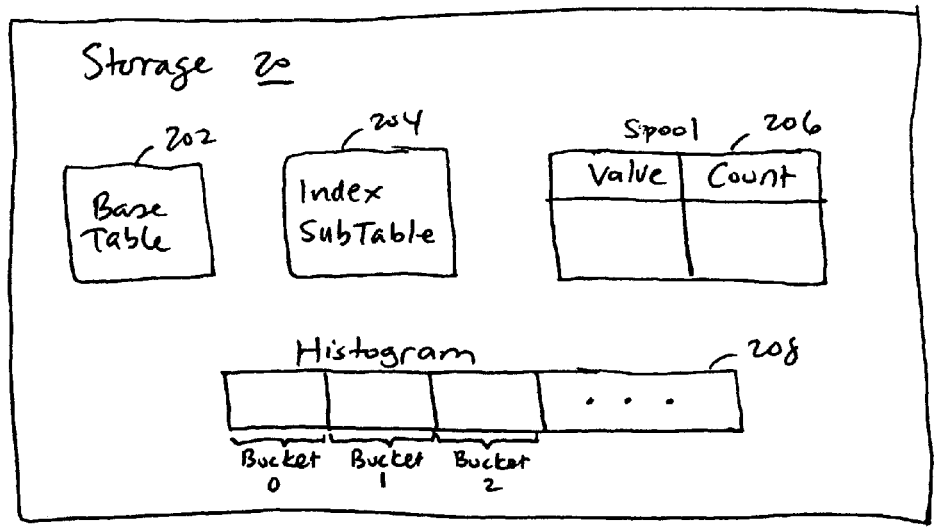
FIG. 3 is a block diagram of a storage containing various data structures.

In the process of FIG. 2, a variable i is initialized (at 102). For example, i can be initialized to the value 0. The skip factor N is also initialized to a predefined value to achieve a specific sample size. For example, N can be set to some value that specifies a sample size of about 1%, 2%, 5%, 10%, 25%, and so forth. Next, the AMP 16 scans (at 104) block i of a base table 202 or subtable 204 (FIG. 3).

In scanning the block, all rows in the block are read. In reading the rows of the block, duplicate values of the attribute on which statistics are being collected are identified, with the number of duplicates counted. A (Value, Count) data structure is updated (at 106) based on the identification of a value and its duplicates. "Value" represents the value of the attribute on which statistics is being collected, and "Count" refers to the number of occurrences of the associated value. The (Value, Count) data structure is stored in a temporary location, referred to as a spool 206, as shown in FIG. 3. If a given value of an attribute occurs just once, Count is set to one.

Next, the AMP 16 determines (at 108) if a skewed value has been detected. This occurs when a given attribute value exceeds a predetermined frequency of occurrence. In other words, Value is skewed if Count is greater than some predefined number. If this is detected, then the skip factor N is adjusted (at 110). In one embodiment, the skip factor N is reduced to increase the sample size. The value of N is adjusted based on the number of instances of detecting skew. The more instances of skewed values detected, the lower the value of N. In other words, if there is a lot of skew detected when scanning the table, the sample size continues to be increased by successively decreasing the value of N. In one embodiment, the minimum value of N is 1, so that the sample size is typically less than or equal to 50% of a given table. Under certain conditions, the sample size can be greater than 50%.

Next, the AMP 16 increments (at 112) the value of i by adding to itself the value (N+1). Next, the AMP 16 determines (at 114) if all the blocks of the table portion have been scanned. If not, the AMP 16 scans (at 104) the next block i (which has been incremented by N+1). If all blocks have been processed, then the AMP 16 generates (at 116) a histogram 208 (FIG. 3). As shown in FIG. 3, the histogram 208 contains multiple intervals or buckets. Each bucket contains the following information (according to one example implementation): a maximum value covered by an interval; a mode value (which is the most frequently occurring value in the interval); a number corresponding to the frequency of mode value; a number corresponding to the number of values not equal to the mode value in the interval; and a total number of rows in the bucket/interval. In other implementations, other types of statistics can be collected.

Since the histogram 208 is based on a sample, the frequencies of the non-mode values and the total number of rows are multiplied by some factor to reflect estimated frequencies in the entire table. For example, if an effective sample size is 5%, and the total number of rows is 1000, then that frequency is multiplexed by a factor of 20 (1000×20) to obtain a value of 20000, which is the estimated total number of rows for the entire table.

Note that each AMP builds a local histogram that is based on the (Value, Count) pairs stored in spool 206.

Figure 4:
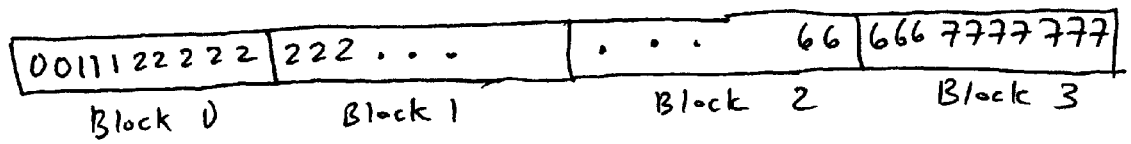
FIG. 4 illustrates a portion of data stored as blocks.

When scanning the blocks of a table, it is often the case that a value of an attribute on which statistics is being collected spans multiple blocks. For example, as shown in FIG. 4, block 0 contains attribute values 0, 1, and 2. However, the attribute value 2 is also stored in block 1. To accurately count the duplicates of a given data value (e.g., 2), the scan of block 0 extends into a portion of the adjacent block 1 to identify all duplicates of the value 2. Since data values are ordered by hash code in one embodiment, equal data values are physically adjacent.

Similarly, when skipping to the next block (block 3 in the example) based on the value of the skip factor N (N=2 in the example), the scan of block 3 can extend backwards into block 2 to retrieve all duplicate values that span blocks 2 and 3. In the example shown, the value 6 starts somewhere in block 2 and continues into block 3.

Thus, generally, in performing the scan (at 104 in FIG. 2), portions of adjacent blocks are also scanned to retrieve duplicates so that an accurate duplicate count is recorded.

Instructions of the various software routines or modules discussed herein (such as the AMPs 16) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules and layers) are stored in respective storage units, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computer-implemented database system, comprising:
a processor for receiving a query to be executed against a database table stored within a computer storage device, said processor executing the steps of:
scanning a sample of said table, the sample containing less than all rows of the table;
detecting whether data skew exists in a table column within the sample of said table;
adjusting a size of the sample as the table is scanned based on the detected data skew;
collecting statistics based on the adjusted sample; and
optimizing the performance of said query executed against said database table based upon said collected statistics.

2. The database system of claim 1, wherein detecting whether data skew exists in a table column within the sample of said table comprises detecting if a frequency of a data value within said table column within the sample of said table is greater than a predetermined threshold.

3. The database system of claim 1, wherein adjusting the size of the sample comprises increasing the size of the sample in response to detecting data skew in a table column within the sample of said table.

4. The database system of claim 3, wherein adjusting the size of the sample comprises successively increasing the size of the sample in response to plural instances of detecting data skew.

5. The database system of claim 1, wherein scanning the sample comprises reading one block, skipping N blocks, and then repeating the reading and skipping until complete.

6. The database system of claim 1, wherein adjusting the size of the sample comprises adjusting a value of N.

7. The database system of claim 1, wherein collecting the statistics comprises building a histogram.

8. The database system of claim 1, wherein said database table is stored on plural computer storage devices that are managed by respective processors, wherein the scanning, identifying, adjusting, and collecting are performed by each of the processors in parallel.

9. An article comprising at least one storage medium containing instructions that when executed cause a system to:
collect statistics of an attribute of a table based on a sample of the table, the sample having less than all rows of the table;
detect whether data skew exists in a table column within the sample of the table;
vary a size of the sample during statistics collection in response to detecting data skew;
collect statistics based on the size of said sample; and
optimize the performance of a query executed against said database based upon said collected statistics.

10. The article of claim 9, wherein varying the size of the sample comprises increasing the size of the sample in response to detecting data skew.

11. The article of claim 10, wherein detecting for data skew comprises determining if a number of duplicates of a data value within said table column within the sample of said table exceeds a predetermined threshold.

12. The article of claim 9, wherein the instructions when executed cause the system to skip rows of data to obtain the samples less than all rows of the table.

13. The article of claim 9, wherein the instructions when executed cause the system to read a block of data, skip N blocks, and repeat the reading and skipping until completed to obtain the sample less than all rows of the table.

14. A database system comprising:
a storage to store a table; and
a controller to:
read a sample of the table that is less than all rows of the table;
collect statistics based on the sample;
detect whether data skew exists in a table column within the sample of the table;
adjust a size of the sample in response to detecting data skew;
collect statistics based on the adjusted sample; and
optimize the performance of a query executed against said database based upon said collected statistics.

15. The database system of claim 14, the controller to collect statistics of an attribute of the table, the attribute being sorted by some predetermined algorithm.

16. The database system of claim 15, wherein the predetermined algorithm comprises a hash code.

17. The database system of claim 14, the controller to increase the size of the sample in response to detecting data skew.

18. The database system of claim 14, wherein the storage contains multiple storage modules, and the controller comprises plural access modules to manage access of the storage modules, wherein each of the access modules performs the reading, collecting, and adjusting in parallel.

* * * * *